United States Patent [19]

Nuspl

[11] 4,388,691

[45] Jun. 14, 1983

[54] VELOCITY PRESSURE AVERAGING SYSTEM

[75] Inventor: Steven P. Nuspl, Barberton, Ohio

[73] Assignee: The Babcock & Wilcox Company, New Orleans, La.

[21] Appl. No.: 227,864

[22] Filed: Jan. 23, 1981

[51] Int. Cl.³ .............................................. G06F 7/38
[52] U.S. Cl. ................................ 364/510; 73/861.02; 73/861.48; 364/575
[58] Field of Search ............... 364/510, 575, 803, 811, 364/814, 558; 73/861, 861.02, 198, 861.42, 861.43, 861.44, 861.48

[56] References Cited

U.S. PATENT DOCUMENTS

| | | | |
|---|---|---|---|
| 3,378,676 | 4/1968 | Clement | 364/575 |
| 3,553,444 | 1/1971 | Tong | 364/575 |
| 3,673,392 | 6/1972 | Holm | 364/510 |
| 3,678,257 | 7/1972 | Lilley et al. | 364/510 |
| 3,929,017 | 12/1975 | Kowalski | 364/575 |
| 3,934,471 | 1/1976 | White et al. | 364/510 |
| 3,949,608 | 4/1976 | Abbey et al. | 364/575 |
| 4,193,118 | 3/1980 | Nash et al. | 364/575 |
| 4,300,401 | 11/1981 | Pedersen | 364/510 |

Primary Examiner—Errol A. Krass

Attorney, Agent, or Firm—James A. Hudak; Vytas R. Matas; Robert J. Edwards

[57] ABSTRACT

A device which can determine either the velocity pressure or the velocity of a flowing gas or air stream and averages same over a predetermined period of time is disclosed. The device utilizes a three-hole yaw probe or similar sensing means which is immersed in the stream to provide measurements of both static pressure differential and velocity pressure. The device includes a null threshold detector (14) which permits the processing of velocity pressure measurements only when the static pressure differential is within a pre-set range thus insuring the proper alignment of the probe or other sensing means in the stream. A square root extractor (20) and switching means (22) are also provided permitting the measurement and averaging of the square root of the velocity pressure measurement, i.e., velocity of the stream, by the device. The velocity pressure measurements or the square root thereof are exhibited on a first digital display (28) permitting the operator to monitor the measurements as they are taken. The measurements are subsequently averaged over a predetermined period of time by an arithmetic processor (18) and the resulting average is exhibited on a second digital display (30).

11 Claims, 4 Drawing Figures

VELOCITY PRESSURE AVERAGING SYSTEM

TECHNICAL FIELD

The present invention relates generally to a device for measuring the velocity of a flowing gas or air stream, and more particularly to a portable device which can readily measure either the velocity pressure or the square root of velocity pressure of such a stream and average same over the predetermined period of time.

BACKGROUND ART

Measurement of the velocity of a flowing gas or air stream within a duct is commonly made with a Pitot tube or an inclined manometer. Unfortunately, a Pitot tube is not a directionally sensitive device and thus it is very difficult to determine whether the probe is properly oriented in the stream. Improper orientation usually results in inaccurate measurements of velocity pressure or the square root thereof, which is representative of velocity. Proper orientation of the probe with respect to the flowing gas or air stream is required in order to obtain accurate measurements of the foregoing parameters. The use of an inclined manometer also has several inherent disadvantages in that it usually requires a steady surface for supporting same and the operator thereof needs a fairly high degree of experience in order to develop an ability to determine an average value from the velocity pressure readings that are taken.

Because of the foregoing, it has now become desirable to develop a portable device which can accurately measure the velocity pressure or the square root of velocity pressure of a flowing gas or air stream, average these readings, and display same to the operator thereof.

SUMMARY OF THE INVENTION

The present invention solves the aforementioned problems associated with the prior art as well as other problems by providing a portable instrument which can accurately measure both velocity pressure or the square root thereof, average these parameters over a predetermined period of time, and display the resulting average to the operator of the device. The device typically utilizes a three-hole yaw probe which is immersed in the flowing gas or air stream to provide a measurement of the static pressure differential, which will be nearly zero if the probe is properly aligned in the stream, and velocity pressure. The device is provided with a null threshold detector which permits the processing of the velocity pressure measurements only when the static pressure differential is within a pre-set range on either side of zero. A square root extractor is also provided permitting measurements of the square root of velocity pressure, i.e., a signal directly proportional to velocity, to be processed and averaged. The measurements of velocity pressure or the square root thereof are continuously sampled and shown on a digital display. If the static pressure differential is within the pre-set range, the measurements are transmitted to an arithmetic processor for averaging over a predetermined period of time. The time period selected by the operator determines the number of measurements accumulated before an average value is computed. A second digital display is utilized for displaying this average value of velocity pressure or the square root thereof after it has been computed by the arithmetic processor. In this manner, the operator can continuously monitor the signal being averaged on one digital display while the second digital display is utilized for exhibiting the final average value after it has been computed. In an alternate embodiment of the invention, the null threshold detector, the square root extractor, and the arithmetic processor are combined in a programmable read only memory (PROM) which greatly increases the capabilities of this system.

In view of the foregoing, it will be seen that one aspect of the present invention is to provide a device that can accurately measure both the velocity pressure or the square root of velocity pressure of a flowing gas or air stream.

Another aspect of the present invention is to provide a device that processes measurements of velocity pressure or the square root thereof only when the measuring probe is properly aligned with the flowing gas or air stream.

Still another aspect of the present invention is to provide a device that averages the measurements of velocity pressure or the square root thereof over a predetermined period of time and displays same in a digital format.

Yet another aspect of the present invention is to provide a device whose mode of operation can be readily changed so that the square root of the velocity pressure of a flowing gas or air stream can be determined and averaged.

These and other aspects of the present invention will be more clearly understood after a review of the following description of the preferred embodiment when considered with the following drawings.

DESCRIPTION OF THE PREFERRED EMBODIMENT

Figure 1:
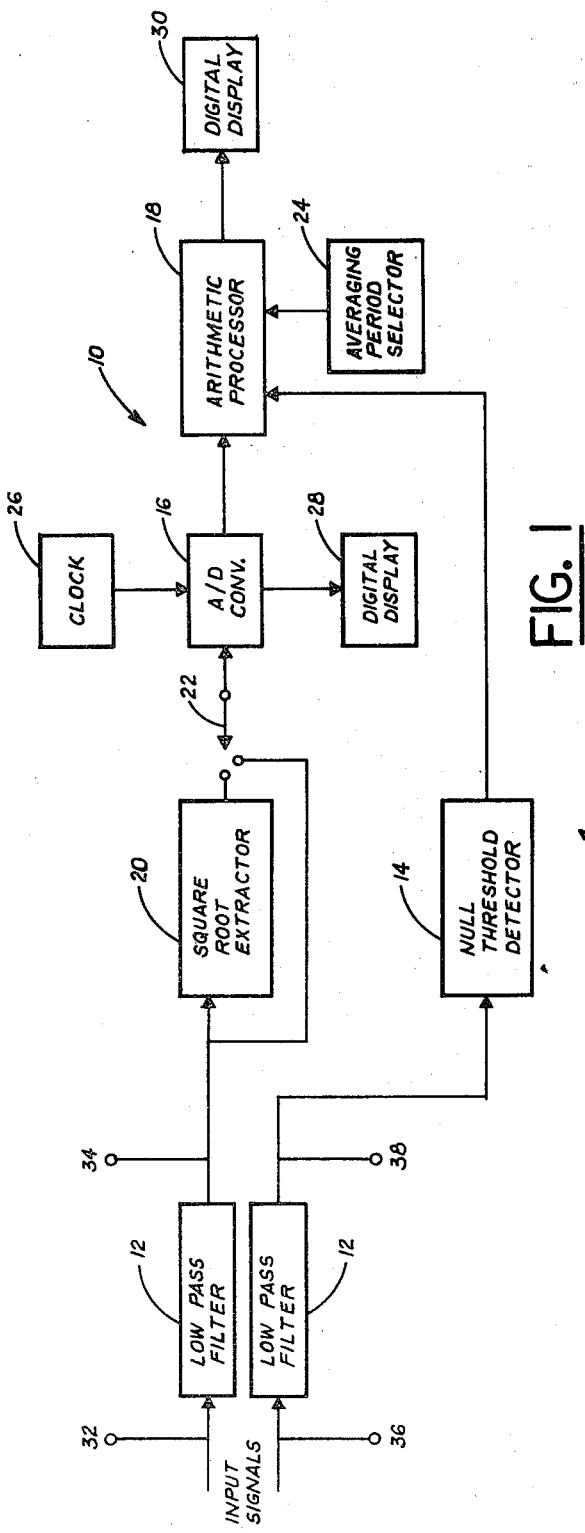
FIG. 1 is a schematic diagram of the apparatus of the present invention.

Referring now to the drawings where the illustrations are for the purpose of describing the preferred embodiment of the invention and are not intended to limit the invention hereto, FIG. 1 is a schematic diagram of the electrical circuit 10 used by the apparatus of the present invention. The circuit 10 is comprised of low pass filters 12, a null threshold detector 14, an analog to digital converter 16, and an arithmetic processor 18. The aforementioned components are interconnected electrically such that the output of the null threshold detector 14 and the analog to digital converter 16 are connected to the inputs of the arithmetic processor 18. A square root extractor 20 and a switching device 22 are interposed between the output of the low pass filter 12 and the input of the analog to digital converter 16 permitting the switching of the square root extractor 20 into the circuit when desired, as hereinafter described. An averaging period selector 24 is connected to the input to the arithmetic processor 18 and is utilized to vary the period over which measurements are taken. A clock generator 26 is connected to the analog to digital converter 16 and is utilized as the synchronizing means or time base for the analog to digital converter 16. A digital display 28 is provided to continuously exhibit the output of the analog to digital converter 16. Similarly, a digital display 30 is provided to digitally indicate the output of the arithmetic processor 18. Analog outputs are provided for connection to recording devices (not shown). Output jacks 32, 34 are provided for testing the unfiltered and filtered velocity pressure signals, respectively. Similarly, output jacks 36, 38 are provided for testing the respective unfiltered and filtered null signal, hereinafter described. The function and operation of each of the foregoing components will be hereinafter described.

Figure 3:
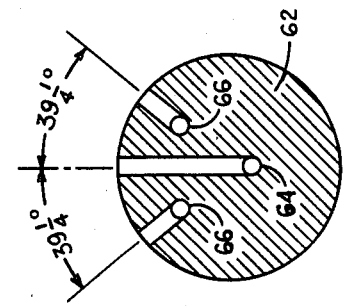
FIG. 3 is a cross-sectional view of a three-hole yaw probe taken across section-indicating lines 3—3 in FIG. 2.
Figure 2:
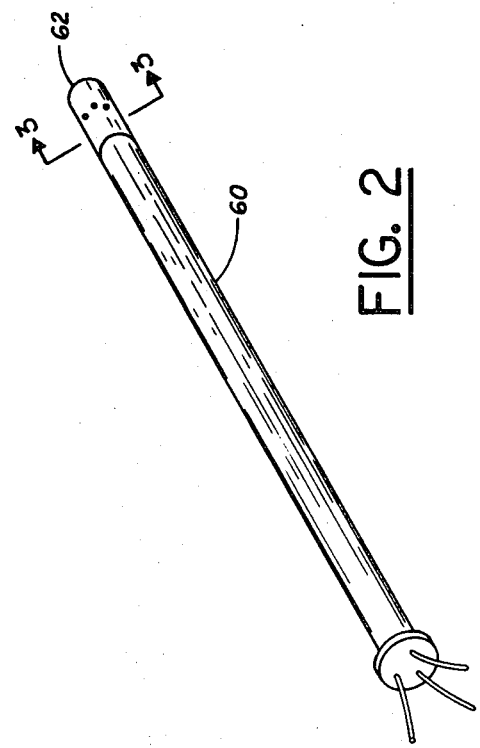
FIG. 2 is a perspective view of a three-hole yaw probe, commonly known as a Fechheimer probe, typically used as the sensing probe for the apparatus of the present invention.

The sensing device typically used with the foregoing electrical circuit is a three-hole cylindrical yaw probe 60, illustrated in FIGS. 2 and 3. This probe 60, commonly known as a Fechheimer probe, is comprised of a generally solid tube in which is provided three separate holes arranged circumferentially on its cylindrical sensing head 62. These three holes include a center hole, known as a total pressure hole 64, and two outer holes, known as static pressure holes 66, one static pressure hole 66 being located on either side of the total pressure hole 64 and angularly offset therefrom by an angle of approximately $39\frac{1}{4}°$. The probe 60 can be fabricated in any desired length and includes three pressure lines running the full length thereof for connection to pressure indicators or Magnehelic gauges (not shown) and to the apparatus of the present invention. A pressure indicator can be connected across the static pressure holes 66 for the measurement of the pressure differential therebetween. Similarly, a pressure indicator can be connected across the total pressure hole 64 and either of the static pressure holes 66 for the measurement of velocity pressure. In practice, regardless of the type of apparatus employed, it has been desired to minimize the pressure differential across the static pressure holes 66 so that an accurate velocity pressure reading can be made across the total pressure hole 64 and either of the static pressure holes 66.

In operation, the probe 60 is immersed in the flowing gas or air stream and angularly rotated about its longitudinal axis until a generally zero pressure differential or null exists across the static pressure holes 66. This indicates that the total pressure hole 64 is properly aligned with the flowing gas or air stream at the point of measurement. The velocity pressure between either of the static pressure holes 66 and the total pressure hole 64 and the pressure differential between the static pressure holes 66 are then measured and used as the input signals to the low pass filter 12. It should be noted that even though the apparatus is designed for such a three-hole yaw probe 60, it can be used with any type of probe or sensing device where the pressure differential across two static pressure holes or ports and the velocity pressure between one of the static pressure holes or ports and a total pressure hole or port are determined.

The two pressure signals provided by the probe 60, i.e., the velocity pressure signal between either of the static pressure holes 66 and the total pressure hole 64 and the pressure differential signal between the static pressure holes 66, are converted by pressure transducers (not shown) within the device to electrical voltage signals. The magnitude of the pressure differential or null signal, and its algebraic sign are indicative of the degree and direction of misalignment of the probe 60 with the direction of the flowing gas or air stream at the point of measurement.

The operator of the device rotates the probe 60 about its longitudinal axis to produce a zero or nearly zero pressure differential between the static pressure holes 66. The velocity pressure voltage signal, or the square root thereof, is continuously sampled and digitized by the analog to digital converter 16 and exhibited on the digital display 28. The position of the switching device 22 determines whether the square root extractor 20 is bypassed in which case the analog to digital converter 16 digitizes the velocity pressure signal. When the square root extractor 20 is not bypassed, the velocity pressure signal is allowed to pass therethrough, and the analog to digital converter 16 digitizes the square root of the velocity pressure which is subsequently exhibited on the digital display 28.

The low pass filter 12 is utilized to filter out the high frequency components that are typically present in the velocity pressure signal and the pressure differential signal and, as such, is set to filter out all frequency components above five cycles per second in the voltage signals representative of these parameters produced by the pressure transducers. The resulting signals are smoothed versions of the original signals thus minimizing the possibility of an extraneous signal or noise from influencing the magnitude of either voltage signal.

The null threshold detector 14 controls the arithmetic processor 18 and permits the apparatus to process measurements of velocity pressure or the square root thereof only when the pressure differential between the two static pressure holes 66 is within a certain range. In this manner, measurements are only processed when the probe 60 is properly aligned with the flowing gas or air stream. The device is provided with an adjustable range on either side of zero (null) for the measurement of the pressure differential between the static pressure holes 66. As long as the pressure differential between the static pressure holes 66 remains within this range, the apparatus is allowed to process measurements of velocity pressure or the square root thereof. As soon as the pressure differential between the static pressure holes 66, i.e., the null signal, falls outside the operator selected range (the sample window), the apparatus stops processing measurements of velocity pressure or the square root thereof until the probe 60 is again realigned with the flowing gas or air stream or the pressure differential across the static pressure holes 66 again falls within the pre-selected range. This range can be set from 0 to ±0.25 inches water column gage (in. wg.), however, normally a range of ±0.10 in. wg. is used and preferably a range of ±0.05 in. wg. should be used to insure the accuracy of the velocity pressure measurement.

A manual reset button (not shown) is provided to start the processing of velocity pressure measurements or the square root thereof. Actuation of this reset button clears the arithmetic processor 18 and the digital display 30, and resets the sample counter (not shown). The digital display 30 remains blank until all of the measurements taken during the time indicated on the averaging period selector 24 have been processed.

After the reset button has been actuated, measurements of velocity pressure or the square root thereof are processed by the arithmetic processor 18 as long as the pressure differential between the static pressure holes 66, i.e., the null signal, remains within the operator selected range (the sample window). If the null signal goes outside the operator selected range, the arithmetic processor 18 stops processing the velocity pressure measurements or the square root thereof until the probe 60 is again properly aligned with the flowing gas or air stream. When the null signal is within the operator selected range (the sample range), the device processes velocity pressure measurements or the square root thereof at the rate of ten samples per second which is at least twice the highest frequency component within the filtered velocity pressure signal or the filtered signal representative of the square root of velocity pressure. If the null signal goes outside the operator selected range, the null threshold detector 14 causes the arithmetic processor 18 to stop processing data while retaining all data that had been sampled and processed up to that time, as well as the number of samples accumulated. Rotation of the probe 60 to realign same with the flowing gas or air stream causes the null signal to reenter the operator selected range at which time the null threshold detector 14 restarts the arithmetic processor 18, and processing of the velocity pressure measurements or the square root thereof recommences. Similarly, rotation of the probe 60 may not be necessary to recommence processing operations if the flowing gas or air stream changes in magnitude and/or direction so that the null signal again falls within the operator selected range. In effect, the sampling-processing operation is automatically interrupted and restarted as a function of whether the null signal is within the operator selected range (the sample window).

The averaging period selector 24 is adjustable from one to ninety-nine seconds of actual averaging time. Inasmuch as the sampling rate is ten times per second, the minimum number of measurements which can be averaged by the arithmetic processor 18 is ten whereas the maximum number which can be averaged is 990 measurements. Any whole number averaging period between and including one to ninety-nine seconds can be selected by the operator of the device. The number of samples accumulated before an average value is computed is always the product of the sampling rate and the averaging period selected. Thus, in effect, the averaging period selector 24 establishes the number of samples which must be accumulated before an average is computed.

The arithmetic processor 18 performs a plurality of operations. It totals the digitized values of velocity pressure or the square root thereof generated by the analog to digital converter 16, and sums the number of samples taken. After the proper number of samples has been accumulated, it divides the sum of the digitized values by the number of samples taken to give an average which is exhibited on the digital display 30. After this averaging process has been completed for the averaging period selected, the average value remains displayed on the digital display 30 until the device is manually reset for another averaging cycle.

The device is typically operated on line voltage of 110 volts, 60 cycles and the foregoing apparatus can be placed in a portable carrying case for use in the field. The case can also include a first Magnehelic gauge, having a range of 0 to ±0.5 in. wg., connected across the static pressure holes 66 to measure the pressure differential therebetween, i.e., the null pressure differential; a second Magnehelic gauge, having a range of 0 to 5.0 in. wg., connected across either static pressure hole 66 and the total pressure hole 64 to measure the velocity pressure therebetween; and a third Magnehelic gauge, having a range of 0 to 30.0 in. wg., connected to either static pressure hole 66 to measure the static pressure. The case would also contain a first pressure transducer connected in parallel with the first Magnehelic gauge for the production and transmission of the input voltage signal representative of the null pressure differential to the apparatus, and a second pressure transducer connected in parallel with the second Magnehelic gauge for the production and transmission of the input voltage signal representative of velocity pressure to the apparatus. In addition, indicator lamps (LED'S) may be provided in conjunction with the first Magnehelic gauge associated with the measurement of the null pressure differential. If the pressure differential between the static pressure holes 66 is within the pre-selected range on either side of the null point, a green LED will be lit. If, however, this pressure differential is outside the pre-selected range, a red LED will light. Two red LED'S are provided, one on either side of the green LED to provide a visual indication to the operator of the direction of angular misalignment of the probe 60.

Figure 4:
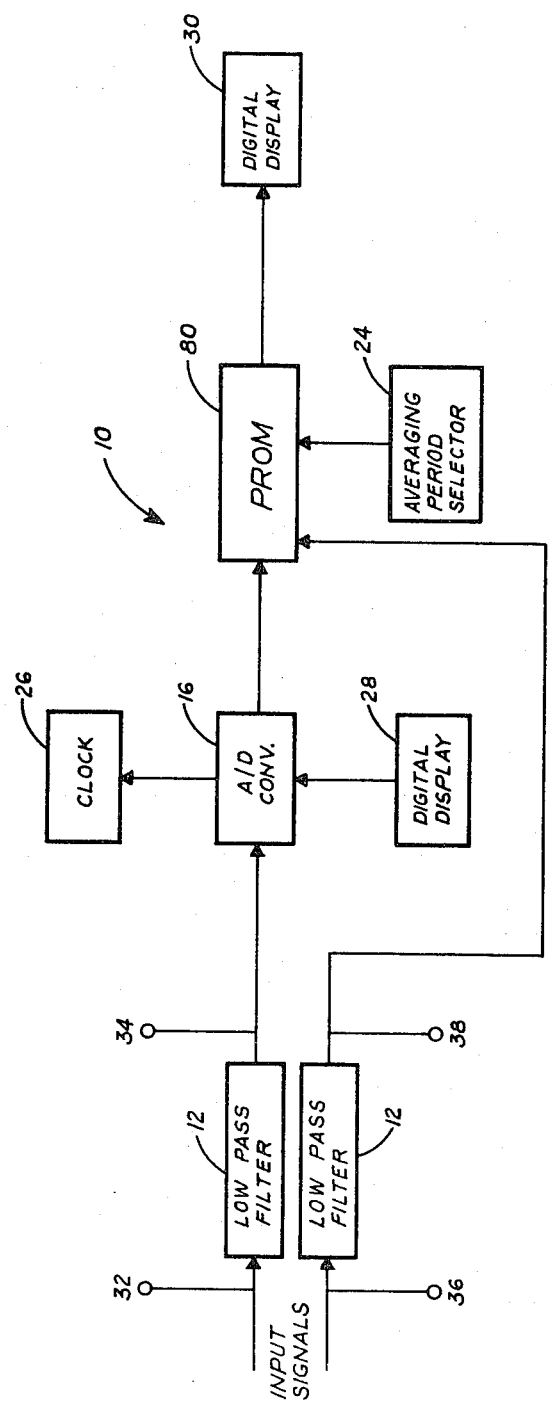
FIG. 4 is a schematic diagram of the apparatus of another embodiment of the present invention.

In an alternate embodiment of the invention, as shown in FIG. 4, the analog to digital converter 16 is connected directly to the low pass filter 12, and the null threshold detector 14, square root extractor 20, and arithmetic processor 18 are replaced with a programmable read only memory (PROM) 80. This embodiment greatly increases the flexibility of the system since any mathematical operation within the program limits of the PROM can be performed. In addition, the signal processing capabilities are only limited by the program storage capacity of the PROM.

The alternate embodiment of the invention differs from the first embodiment in that all velocity pressure measurements are digitized before any mathematical operations, if required, are performed thereon. In all other respects it operates in the same manner as the first embodiment and thus its operation will not be described. Its capabilities, however, greatly exceed those of the first embodiment because it can be programmed accordingly.

Certain modifications and improvements will occur to those skilled in the art upon reading the foregoing. It should be understood that all such modifications and improvements have been deleted herein for the sake of conciseness and readability but are properly within the scope of the following claims.

I claim:

1. Apparatus for measuring the velocity pressure of a flowing gas or air stream comprising means for sampling measurements of the velocity pressure of said stream, means for averaging said sampled measurements of said velocity pressure to determine an average value of said velocity pressure measurements, and means for detecting the static pressure differential at the point in the said stream at which said velocity pressure measurements are being taken, said detecting means permitting said velocity pressure measurements to be transmitted to said averaging means only when said static pressure differential is detected to be within a predetermined range.

2. The apparatus as defined in claim 1 wherein said averaging means averages all of said sampled measurements of the velocity pressure of said stream transmitted thereto over a predetermined period of time.

3. The apparatus as defined in claim 1 further including means for extracting the square root of said sampled measurements of velocity pressure, said square root extracting means producing signals representative of the velocity of said stream, said representative signals of the velocity of said stream being subsequently processed by said averaging means to determine an average value of the velocity of said stream.

4. The apparatus as defined in claim 3 further including means for switching between a first mode of operation wherein said averaging means determines an average value of said sampled measurements of velocity pressure and a second mode of operation wherein said averaging means determines an average value of the square root of said sampled measurements of velocity pressure.

5. Apparatus for measuring various parameters associated with a flowing gas or air stream comprising means for sampling measurements of a first parameter of said stream, means for averaging said sampled measurements of said first parameter to determine an average value of said measurements, and means for detecting the value of a second parameter at the point in the said stream at which said measurements of said first parameter are being taken, said detecting means permitting said measurements of said first parameter to be transmitted to said averaging means when the value of said second parameter is in a predetermined range further including means for extracting the square root of said sampled measurements of said first parameter, said square root extracting means producing signals for subsequent processing by said averaging means to determine an average value of the square root of the sampled measurements of said first parameter.

6. The apparatus as defined in claim 5 further including a first digital display for continuously exhibiting the value of said first parameter transmitted to said sampling means.

7. The apparatus as defined in claim 5 wherein said averaging means averages all of said sampled measurements of said first parameter transmitted thereto over a predetermined period of time.

8. The apparatus as defined in claim 7 wherein said averaging means includes means for adjusting said predetermined period of time.

9. The apparatus as defined in claim 7 further including a second digital display for exhibiting the average value of all of said sampled measurements of said first parameter transmitted to said averaging means over said predetermined period of time.

10. The apparatus as defined in claim 5 further including means for switching between a first mode of operation wherein said averaging means determines an average value of said sampled measurements of said first parameter and a second mode of operation wherein said averaging means determines an average value of the square root of said sampled measurements of said first parameter.

11. Apparatus for measuring the velocity pressure of a flowing gas or air stream comprising means for sampling measurements of the velocity pressure of said stream, means for extracting the square root of said sampled measurements of velocity pressure, said square root extracting means producing signals representative of the velocity of said stream, means for averaging said sampled measurements of velocity pressure or said signals representative of the velocity of said stream to determine an average value of said velocity pressure measurements or said signals representative of velocity over a predetermined period of time, means for switching between a first mode of operation wherein said averaging means determines an average value of said sampled measurements of velocity pressure and a second mode of operation wherein said averaging means determines an average value of said signals representative of velocity, and means for detecting the static pressure differential at the point in the said stream at which said velocity pressure measurements are being taken, said detecting means permitting said measurements of said velocity pressure or said signals representative of velocity to be transmitted to said averaging means when said static pressure differential is in a predetermined range.

* * * * *